United States Patent
Rotvold et al.

(10) Patent No.: US 10,638,093 B2
(45) Date of Patent: Apr. 28, 2020

(54) WIRELESS INDUSTRIAL PROCESS FIELD DEVICE WITH IMAGING

(71) Applicant: Rosemount Inc., Chanhassen, MN (US)

(72) Inventors: Eric Darrell Rotvold, West St. Paul, MN (US); Chad Michael McGuire, Shakopee, MN (US); Robert J. Karschnia, Chaska, MN (US); Robert Martin Beckmann, Farmington, MN (US)

(73) Assignee: ROSEMOUNT INC., Shakopee, MN (US)

( * ) Notice: Subject to any disclaimer, the term of this patent is extended or adjusted under 35 U.S.C. 154(b) by 540 days.

(21) Appl. No.: 14/038,090

(22) Filed: Sep. 26, 2013

(65) Prior Publication Data
US 2015/0085103 A1    Mar. 26, 2015

(51) Int. Cl.
*H04N 7/18* (2006.01)
*G05B 19/418* (2006.01)

(52) U.S. Cl.
CPC ....... *H04N 7/183* (2013.01); *G05B 19/41855* (2013.01); *H04N 7/185* (2013.01); *G05B 2219/31211* (2013.01); *G05B 2219/31447* (2013.01); *Y02P 90/185* (2015.11)

(58) Field of Classification Search
CPC .. H04N 21/6175; H04N 21/25; H04N 21/414; H04N 21/44227; H04N 7/183; H04N 7/185
See application file for complete search history.

(56) References Cited

U.S. PATENT DOCUMENTS

| 3,857,277 A | 12/1974 | Moore |
| 4,306,457 A | 12/1981 | Fukui |
| 4,736,250 A | 4/1988 | Blazo |
| 4,900,161 A | 2/1990 | Wolf et al. |
| 4,947,247 A | 8/1990 | Farver |

(Continued)

FOREIGN PATENT DOCUMENTS

| AU | 2002256070 | 5/2006 |
| CN | 1214958 | 4/1999 |

(Continued)

OTHER PUBLICATIONS

MIT News, Researchers amplify variations in video, making the invisible visible, Larry Hardesty, Jun. 22, 2012, http://web.mit.edu/newsoffice/2012/amplifying-invisible0video-0622/html).*

(Continued)

*Primary Examiner* — Obafemi O Sosanya
(74) *Attorney, Agent, or Firm* — Westman, Champlin & Koehler, P.A.

(57) ABSTRACT

A wireless field device for use in an industrial process control or monitoring system includes a controller configured to control operation of the wireless field device. Wireless communication circuitry is configured to wirelessly communicate with a remote location. An internal power source powers the wireless field device. An image capture device is coupled to the controller and configured to capture an image of an environment of the wireless field device. The controller is adapted to receive image information from the image capture device and transmit compressed image information to the remote location.

23 Claims, 6 Drawing Sheets

(56) References Cited

U.S. PATENT DOCUMENTS

| | | |
|---|---|---|
| 5,056,046 A | 10/1991 | Mutchler |
| 5,109,277 A | 4/1992 | James |
| 5,144,430 A | 9/1992 | Boelart |
| 5,292,195 A | 3/1994 | Crisman, Jr. |
| 5,638,174 A | 6/1997 | Henderson |
| 5,654,977 A | 8/1997 | Morris |
| 6,000,844 A | 12/1999 | Cramer et al. |
| 6,059,453 A | 5/2000 | Kempf et al. |
| 6,259,810 B1 | 7/2001 | Gill et al. |
| 6,346,704 B2 | 2/2002 | Kenway |
| 6,461,573 B1 | 10/2002 | Yamamoto et al. |
| 6,518,744 B1 | 2/2003 | Tallman |
| 6,573,331 B1 | 6/2003 | Camberlin |
| 6,631,287 B2 | 10/2003 | Newman et al. |
| 7,208,735 B2 | 4/2007 | Sierra et al. |
| 7,248,297 B2 | 7/2007 | Catrysse et al. |
| 7,372,485 B1 | 5/2008 | Bodnar et al. |
| 7,407,323 B2 | 8/2008 | Hutcherson |
| 7,409,867 B2 | 8/2008 | Toy et al. |
| 7,466,240 B2 | 12/2008 | Evans et al. |
| 7,472,215 B1 | 12/2008 | Mok et al. |
| 7,636,114 B2 | 12/2009 | Aoyama |
| 7,680,460 B2 | 3/2010 | Nelson et al. |
| 7,768,425 B2 | 8/2010 | Evans et al. |
| 7,809,379 B2 | 10/2010 | Hedtke et al. |
| 7,852,271 B2 | 12/2010 | Grunig et al. |
| 7,852,383 B2 | 12/2010 | Harada |
| 8,098,302 B2 | 1/2012 | Fakuda et al. |
| 8,108,790 B2 | 1/2012 | Morrison, Jr. et al. |
| 8,121,078 B2 | 2/2012 | Siann et al. |
| 8,191,005 B2 | 5/2012 | Baier et al. |
| 8,208,752 B2 | 6/2012 | Ishii |
| 8,310,541 B2 | 11/2012 | Moore |
| 8,410,946 B2 | 4/2013 | Ansari et al. |
| 8,538,560 B2 | 9/2013 | Brown et al. |
| 8,706,448 B2 | 4/2014 | Orth |
| 8,898,036 B2 | 11/2014 | Sittler et al. |
| 9,019,108 B2 | 4/2015 | Chillar et al. |
| 9,049,239 B2 | 6/2015 | Kenney et al. |
| 9,201,414 B2 | 12/2015 | Kantzes et al. |
| 9,201,419 B2 | 12/2015 | Timsjo et al. |
| 9,247,374 B2 | 1/2016 | Tomimatsu et al. |
| 9,537,699 B2 | 1/2017 | Kenney et al. |
| 9,696,429 B2 | 7/2017 | Turon et al. |
| 2001/0042834 A1 | 11/2001 | Kenway |
| 2003/0027949 A1 | 2/2003 | Yamamoto et al. |
| 2004/0041538 A1 | 3/2004 | Sklovsky |
| 2004/0156549 A1* | 8/2004 | Persiantsev ............ H04N 19/63 |
| | | 382/236 |
| 2004/0218099 A1* | 11/2004 | Washington ............. H04N 5/77 |
| | | 348/571 |
| 2005/0008072 A1* | 1/2005 | Angerer .................. H03M 7/30 |
| | | 375/240 |
| 2005/0012817 A1 | 1/2005 | Hampapur et al. |
| 2005/0025368 A1* | 2/2005 | Glukhovsky ............ A61B 1/04 |
| | | 382/236 |
| 2005/0111696 A1 | 5/2005 | Baer |
| 2005/0164684 A1 | 7/2005 | Chen et al. |
| 2005/0220331 A1 | 10/2005 | Kychakoff et al. |
| 2006/0026971 A1 | 2/2006 | Sharpe |
| 2006/0092153 A1 | 5/2006 | Chu et al. |
| 2006/0148410 A1* | 7/2006 | Nelson .................... G01D 3/08 |
| | | 455/67.11 |
| 2006/0278827 A1 | 12/2006 | Sierra et al. |
| 2007/0019077 A1* | 1/2007 | Park ................. G08B 13/19621 |
| | | 348/211.99 |
| 2007/0052804 A1 | 3/2007 | Money et al. |
| 2007/0073439 A1 | 3/2007 | Habibi et al. |
| 2007/0125949 A1 | 6/2007 | Murata et al. |
| 2008/0165195 A1* | 7/2008 | Rosenberg ............. G06T 13/40 |
| | | 345/473 |
| 2008/0278145 A1 | 11/2008 | Wenger |
| 2009/0078047 A1 | 3/2009 | Dam |
| 2009/0249405 A1 | 10/2009 | Karaoguz et al. |
| 2009/0285259 A1 | 11/2009 | Allen et al. |
| 2010/0013918 A1 | 1/2010 | Ta ' Eed |
| 2010/0220180 A1 | 9/2010 | Lee et al. |
| 2011/0230942 A1 | 9/2011 | Herman et al. |
| 2011/0317066 A1* | 12/2011 | Capman ............... H04N 19/159 |
| | | 348/438.1 |
| 2012/0025081 A1 | 2/2012 | Rapp et al. |
| 2012/0041582 A1 | 2/2012 | Wallace |
| 2012/0109342 A1 | 5/2012 | Braun et al. |
| 2012/0157009 A1 | 6/2012 | Hollander |
| 2012/0161958 A1 | 6/2012 | Turon et al. |
| 2013/0009472 A1 | 1/2013 | Orth |
| 2013/0085688 A1 | 4/2013 | Miller et al. |
| 2013/0099922 A1 | 4/2013 | Lohbihler |
| 2013/0120561 A1 | 5/2013 | Heintze |
| 2013/0163812 A1* | 6/2013 | Mukasa .................... G06T 9/00 |
| | | 382/103 |
| 2013/0176418 A1 | 7/2013 | Pandey et al. |
| 2013/0222608 A1 | 8/2013 | Baer |
| 2013/0250125 A1 | 9/2013 | Garrow et al. |
| 2013/0294478 A1 | 11/2013 | Puroll et al. |
| 2014/0003465 A1 | 1/2014 | Elke |
| 2014/0128118 A1 | 5/2014 | Tomimatsu et al. |
| 2015/0116482 A1* | 4/2015 | Bronmark ............ G05B 19/042 |
| | | 348/129 |
| 2015/0130927 A1 | 5/2015 | Luxen et al. |
| 2016/0091370 A1 | 3/2016 | Schnaare |

FOREIGN PATENT DOCUMENTS

| | | |
|---|---|---|
| CN | 2694128 | 4/2005 |
| CN | 1882078 | 12/2006 |
| CN | 101014091 | 8/2007 |
| CN | 101019419 | 8/2007 |
| CN | 101046375 | 10/2007 |
| CN | 101277383 | 10/2008 |
| CN | 101460971 | 6/2009 |
| CN | 201322868 Y | 10/2009 |
| CN | 101600046 | 12/2009 |
| CN | 101647216 | 2/2010 |
| CN | 101681161 | 3/2010 |
| CN | 101685295 | 3/2010 |
| CN | 1012483618 | 5/2012 |
| CN | 102830669 | 12/2012 |
| CN | 102999022 | 3/2013 |
| CN | 103380446 | 10/2013 |
| CN | 103947170 A | 7/2014 |
| CN | 204350309 U | 5/2015 |
| EP | 2 130 187 | 4/2017 |
| JP | 52-140779 | 11/1977 |
| JP | 53-86111 | 7/1978 |
| JP | S58-090882 | 5/1983 |
| JP | 61-136340 | 6/1986 |
| JP | 62-179647 | 8/1987 |
| JP | 64-73880 | 3/1989 |
| JP | H07-325900 | 12/1995 |
| JP | H09-265316 | 10/1997 |
| JP | 10-47312 | 2/1998 |
| JP | H10-294933 | 11/1998 |
| JP | 11-23350 | 1/1999 |
| JP | H11-75176 | 3/1999 |
| JP | 11-189603 | 7/1999 |
| JP | 11-218442 | 8/1999 |
| JP | 2000-310577 | 11/2000 |
| JP | 2001-84031 | 3/2001 |
| JP | 2001-221666 | 8/2001 |
| JP | 2001-238198 | 8/2001 |
| JP | 2001-256475 | 9/2001 |
| JP | 2002-300569 | 10/2002 |
| JP | 2004-288092 | 10/2004 |
| JP | 2005-134357 | 5/2005 |
| JP | 2006-031418 | 2/2006 |
| JP | 2007-108836 | 4/2007 |
| JP | 2008-527493 | 7/2008 |
| JP | 2008-257513 | 10/2008 |
| JP | 2009-210042 | 9/2009 |
| JP | 2012-175631 | 9/2010 |
| JP | 2010-536092 | 11/2010 |
| JP | 2010-283444 | 12/2010 |

(56) References Cited

FOREIGN PATENT DOCUMENTS

| | | |
|---|---|---|
| JP | 2011-185926 | 9/2011 |
| JP | 2011-209033 | 10/2011 |
| JP | 2012-037519 | 2/2012 |
| JP | 2012-58093 | 3/2012 |
| JP | 2013-009079 | 1/2013 |
| JP | 2013-533570 | 8/2013 |
| JP | 2014-523033 | 9/2014 |
| RU | 2 372 667 | 11/2009 |
| RU | 2419926 | 5/2011 |
| TW | I220364 | 8/2004 |
| WO | WO 2004/011935 | 2/2004 |
| WO | 2006081154 A3 | 9/2007 |
| WO | WO 2007/139123 | 12/2007 |
| WO | WO 2008/136752 | 11/2008 |
| WO | WO 2009/074708 | 6/2009 |
| WO | WO 2011/004020 | 1/2011 |
| WO | WO 2011/137264 | 11/2011 |
| WO | WO 2013/006307 | 1/2013 |
| WO | WO 2013/009715 | 1/2013 |

OTHER PUBLICATIONS

First Correct Notification for Chinese Patent Application No. 201420426405.7, dated Oct. 31, 2014, 4 pages.
Notification of Transmittal of the International Search Report and the Written Opinion of the International Searching Authority, PCT/US2014/051625, dated Oct. 23, 2014.
DF-TV7-T, Multi-Spectrum 3IR Flame Detector, Groveley Detection Ltd., 2 pgs. no date.
DF-TV7-V, Combined UV/2IR Flame Detector, Groveley Detection Ltd., 2 pgs. no date.
FDS301, Visual Flame Detector FDS301, Groveley Detection Ltd., 2 pgs. no date.
Hardesty, Larry. (MIT News Office). MIT News "Researchers amplify variations in video, making the invisible visible," dated Jun. 22, 2012, 3 pgs. Found at http://web.mit.edu/newsoffice/2012/amplifying-invisible-video-0622.html.
Notification of Transmittal of the International Search Report and the Written Opinion of the International Searching Authority, PCT/US2014/069968, dated Mar. 19, 2015.
Notification of Transmittal of the International Search Report and the Written Opinion of the International Searching Authority, PCT/US2014/051628, dated Apr. 13, 2015.
Office Action from Chinese Patent Application No. 201320868039.6, dated May 19, 2014.
Notification of Transmittal of the International Search Report and the Written Opinion of the International Searching Authority, PCT/US2014/051432, dated Jan. 12, 2015.
Invitation to Pay Additional Fees, PCT/US2014/051628, dated Nov. 25, 2014.
Office Action from Chinese Application Serial No. 201310737591.6, dated Oct. 17, 2016.
Examination Report from Australian Application Serial No. 2014328666, dated Oct. 11, 2016.
Office Action from Chinese Application Serial No. 201410024656.7, dated Oct. 9, 2016.
Office Action from U.S. Appl. No. 14/224,814, dated Jun. 15, 2016.
Office Action from U.S. Appl. No. 14/037,989, dated Jun. 3, 2016.
Office Action from European Application Serial No. 14761468.9, dated May 4, 2016.
Office Action from European Application Serial No. 14783924.5, dated Jun. 3, 2016.
Examination Report from Australian Application Serial No. 2014328576, dated Jul. 21, 2016.
Office Action from European Application Serial No. 14761467.1, dated May 4, 2016.
Office Action from Russian Application Serial No. 2016116020, dated May 31, 2016.
Office Action from U.S. Appl. No. 14/224,814, dated Jul. 8, 2015.
Office Action from U.S. Appl. No. 14/224,858, dated Jun. 12, 2015.
Notification of Transmittal of the International Search Report and the Written Opinion of the International Searching Authority, PCT/US2015/011958, dated May 18, 2015.
"Integrated Wireless Gas Detection Solution", www.gassecure.com, Jun. 2014, 2 pgs.
"GS01 Wireless Gas Detector", www.gassecure.com, Jun. 2014, 2 pgs.
Office Action from U.S. Appl. No. 14/224,858, dated Oct. 2, 2015.
Notification of Transmittal of the International Search Report and the Written Opinion of the International Searching Authority, PCT/US2015/040310, dated Nov. 11, 2015.
Final Office Action from U.S. Appl. No. 14/224,814, dated Feb. 1, 2016.
Office Action from U.S. Appl. No. 14/224,858, dated Feb. 5, 2016.
Office Action from Canadian Application Serial No. 2,923,156, dated Feb. 2, 2017.
Office Action from Canadian Application Serial No. 2,923,153, dated Jan. 16, 2017.
Office Action from Chinese Patent Application No. 201410061865.9 dated Oct. 28, 2016.
Communication from European Patent Application No. 15706956.8, dated Nov. 7, 2016.
Office Action from U.S. Appl. No. 14/037,989, dated Feb. 10, 2017.
Office Action from U.S. Appl. No. 14/499,719, dated Mar. 23, 2017.
Office Action (including Search Report) from Russian Application Serial No. 2016116020, dated Feb. 10, 2017.
Office Action from Chinese Patent Application No. 201410061865.9, dated Jun. 9, 2017.
Third Examination Report from Australian Patent Application No. 2014328576, dated Jun. 29, 2017.
Office Action from Canadian Patent Application No. 2,943,542, dated Jul. 31, 2017.
Office Action from U.S. Appl. No. 14/037,989, dated Aug. 18, 2017.
Office Action from Russian Patent Application No. 2016116017, dated Jun. 8, 2017.
"Heat Transfer Performance for Batch Oscillatory Flow Mixing", by Stephens et al., Elsevier 2002.
Office Action from U.S. Appl. No. 14/038,185, dated Oct. 24, 2016.
Office Action from U.S. Appl. No. 14/038,185, dated May 17, 2017.
Office Action from Russian Patent Application No. 2016116039, dated Jul. 13, 2017.
Third Examination Report from Australian Patent Application No. 2014328666, dated Oct. 10, 2017.
Office Action from Canadian Patent Application No. 2,923,156, dated Nov. 30, 2017.
Office Action from Chinese Patent Application No. 201410024656.7 dated Dec. 28, 2017.
Office Action from Japanese Patent Application No. 2016-517425, dated Jan. 8, 2018.
Office Action from Japanese Patent Application No. 2016-558794, dated Oct. 24, 2017.
Examination Report from Australian Patent Application No. 2015324515 dated Sep. 4, 2017.
Office Action from Chinese Patent Application No. 201410366848.6, dated Nov. 6, 2017.
Office Action from U.S. Appl. No. 14/499,719, dated Oct. 6, 2017.
Final Rejection from Japanese Patent Application No. 2016-516988, dated Nov. 8, 2017, 11 pages.
Office Action from Canadian Patent Application No. 2,957,246, dated Dec. 8, 2017.
Office Action from U.S. Appl. No. 14/038,185, dated Nov. 2, 2017.
Office Action from Chinese Patent Application No. 201310737591.6, dated Nov. 29, 2017.
Office Action from Japanese Patent Application No. 2016-516983, dated Dec. 6, 2017.
Office Action from Canadian Patent Application No. 2,923,153, dated Dec. 13, 2017.
Office Action from Chinese Patent Application No. 201410831781.9, dated Nov. 28, 2017, 13 pages.
Office Action from Japanese Patent Application No. 2017-516333, dated Mar. 20, 2018.
Office Action from U.S. Appl. No. 14/037,989, dated Dec. 29, 2017.

(56) References Cited

OTHER PUBLICATIONS

Office Action from European Patent Application No. 14783924.5, dated Mar. 16, 2018.
Office Action from Canadian Patent Application No. 2,923,156, dated Jun. 19, 2018.
Office Action from Russian Patent Application No. 2017114674, dated May 31, 2018.
Office Action from Canadian Patent Application No. 2,957,246, dated Jul. 30, 2018.
Office Action from Japanese Patent Application No. 2017-516333, dated Jul. 31, 2018.
Office Action from Chinese Patent Application No. 201310737591.6, dated May 24, 2018.
Office Action from U.S. Appl. No. 14/037,989, dated Aug. 16, 2018.
Office Action from U.S. Appl. No. 14/038,185, dated Oct. 19, 2018.
Office Action from Chinese Patent Application No. 201410024656.7, dated Sep. 20, 2018.
Office Action from Chinese Patent Application No. 201410831781.9, dated Aug. 9, 2018.
Office Action from U.S. Appl. No. 14/499,719, dated Jul. 9, 2018.
Office Action from Canadian Patent Application No. 2,923,153, dated Aug. 24, 2018.
Office Action from U.S. Appl. No. 14/037,989, dated Nov. 29, 2018.
Office Action from Russian Patent Application No. 2017114674, dated Oct. 26, 2018.
Office Action from U.S. Appl. No. 14/038,185, dated Apr. 5, 2018.
Trial Decision from Japanese Patent Application No. 2016-516988 (Appeal No. 2017-18657), dated Oct. 31, 2013.
Examination Report from Indian Patent Application No. 201627005256, dated Dec. 22, 2018.
Communication from European Patent Application No. 15744804.4, dated Jan. 31, 2019.
Office Action from Chinese Patent Application No. 201410831781.9, dated Mar. 4, 2019.
Office Action from Japanese Patent Application No. 2017-516333, dated Dec. 18, 2018.
Office Action from U.S. Appl. No. 14/038,185, dated May 16, 2019.
Office Action from Canadian Patent Application No. 2,923,156, dated Mar. 21, 2019.
Office Action from Canadian Patent Application No. 2,923,153 dated Mar. 21, 2019.
Examination Report from Indian Patent Application No. 201627004690, dated Mar. 27, 2019.
Office Action from Japanese Patent Application No. 2018-004260, dated May 28, 2019.
Communication from European Patent Application No. 14761467.1, dated May 29, 2019.
Office Action from Chinese Patent Application No. 201410024656.7, dated Jun. 20, 2019.
Office Action from U.S. Appl. No. 14/037,989, dated Jun. 6, 2019.
Office Action from U.S. Appl. No. 14/499,719, dated Aug. 21, 2019.
Office Action from U.S. Appl. No. 14/037,989, dated Sep. 17, 2019.
Office Action from Australian Patent Application No. 2018222951, dated Jul. 12, 2019.
Office Action from U.S. Appl. No. 14/038,185, dated Oct. 4, 2019.
Examination Report No. 2 from Australian Patent Application No. 2014328666, dated Jun. 16, 2017.
"ADNS-5090 Low Power Optical Mouse Sensor Data Sheet", Avago Technologies, dated Apr. 25, 2012.
Office Action from Chinese Patent Application No. 201410024656.7, dated Jun. 8, 2017.
Office Action from Japanese Patent Application No. 2016-517425, dated Jun. 6, 2017.
Office Action from Australian Patent Application No. 2014328576, dated Feb. 24, 2017.
Office Action from Canadian Patent Application No. 2,923,159, dated Mar. 7, 2017.
Office Action from Japanese Patent Application No. 2016-516988, dated Mar. 24, 2017.
Office Action from Japanese Patent Application No. 2016-516983, dated Mar. 8, 2017.
Office Action from Canadian Patent Application No. 2,923,159 dated May 19, 2017.
Office Action from Chinese Patent Application No. 201410366848.6, dated Feb. 24, 2017.
Communication from European Patent Application No. 15744804.4, dated May 9, 2017.
Office Action from Chinese Patent Application No. 201310737591.6, dated Jun. 1, 2017.
Appeal Decision from Japanese Patent Application No. 2016-517425, dated Oct. 29, 2019.
Examination Report from Indian Patent Application No. 201627004614, dated Dec. 12, 2019.
Communication from European Patent Application No. 14761467.1, dated Dec. 5, 2019.

* cited by examiner

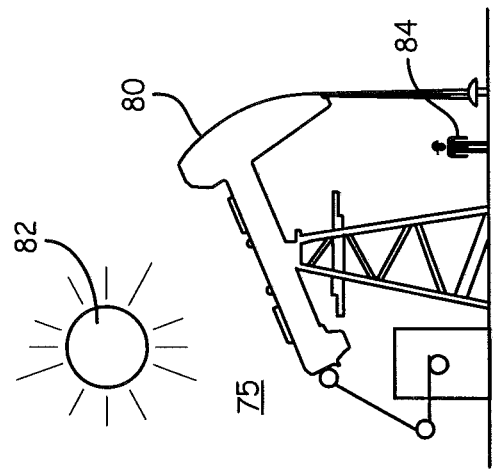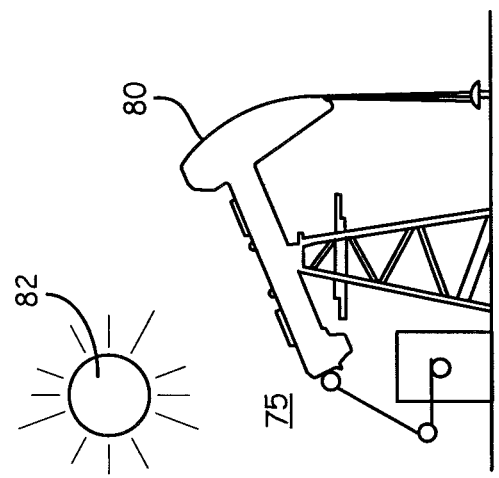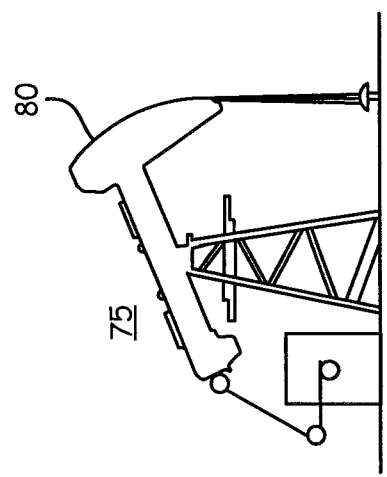

WIRELESS INDUSTRIAL PROCESS FIELD DEVICE WITH IMAGING

BACKGROUND

The present invention relates to industrial process control or monitoring systems. More specifically, the present invention relates to wireless process field devices used in such systems.

In industrial settings, systems are used to monitor and control inventories and operation of industrial and chemical processes, and the like. Typically, the system that performs these functions uses field devices distributed at key locations in the industrial process coupled to control circuitry in the control room by a process control loop. The term "field device" refers to any device that performs a function in a distributed control or process monitoring system, including all devices used in the measurement, control and monitoring of industrial processes.

Typically, each field device also includes communication circuitry that is used for communicating with a process controller, other field devices, or other circuitry, over the process control loop. In some installations, the process control loop is also used to deliver a regulated current and/or voltage to the field device for powering the field device. The process control loop also carries data, either in an analog or digital format.

In some installations, wireless technologies have begun to be used to communicate with field devices. Wireless operation simplifies field device wiring and setup. Wireless installations are currently used in which the field device includes a local power source. However, because of power limitations, the functionality of such devices is typically limited. Further, in some instances, field devices are located at remote locations where it is difficult to visually monitor the surrounding environment. Often, a vehicle must be dispatched with service personnel in order to inspect the site. This may be many miles away and require significant travel time to visit a particularly remote location.

SUMMARY

A wireless field device for use in an industrial process control or monitoring system includes a controller configured to control operation of the wireless field device. Wireless communication circuitry is configured to wirelessly communicate with a remote location. An internal power source powers the wireless field device. An image capture device is coupled to the controller and configured to capture an image of an environment of the wireless field device. The controller is adapted to receive image information from the image capture device and transmit compressed image information to the remote location. A method is also provided.

BRIEF DESCRIPTION OF THE DRAWINGS

FIGS. 4A, 4B, and 4C show example remote environments which may be subject to image capture by the present invention.

DETAILED DESCRIPTION OF ILLUSTRATIVE EMBODIMENTS

Figure 1:
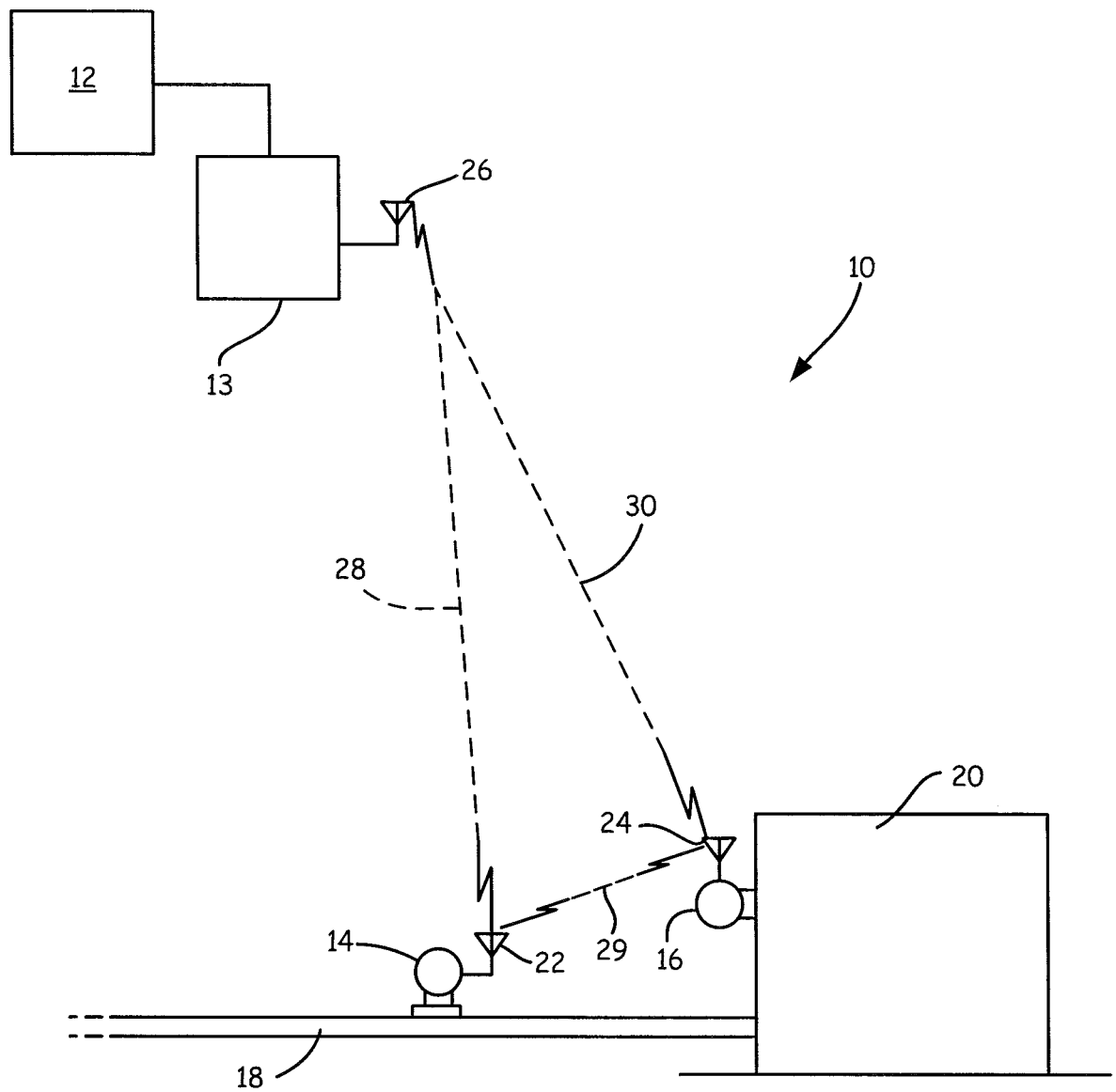
FIG. 1 is a simplified block diagram showing a process control or monitoring system for use with the present invention.

FIG. 1 is a simplified diagram showing an example process control or monitoring system 10 which includes a control room 12 communicating with field devices 14 and 16 through a wireless gateway 13. Communication between gateway 13 and control room 12 may be over a wired or wireless communication link Field device 14 is shown coupled to process piping 18 and field device 16 is shown coupled to storage tank 20. However, devices 14, 16 may be located at any desired location. Devices 14 and 16 include antennas 22 and 24, respectively, for transmitting and/or receiving information from antenna 26 associated with wireless gateway 13. Devices 14 and 16 communicate using wireless radio frequency (RF) communication links 28, 29 and 30 with each other and with a remote location such as gateway 13. One example wireless communication protocol is the WirelessHART® protocol in accordance with IEC 62591. Field devices 14 and 16 include components to provide local (internal) power to the devices without requiring additional wires. For example, device 14 and 16 can include solar cells and/or batteries for local power.

As field device 14 and 16 operate using limited power, their processing abilities and the amount of data which they are capable of transmitting is limited. In one aspect, the present invention includes a wireless field device such as devices 14 and 16, which includes the ability to capture images of an environment in which the field device 14, 16 is located using an image capture device. A controller within the device receives the captured images and generates compressed image information. This compressed image information is transmitted to a remote location using a wireless communication technique. This reduces the amount of power required by the device and also reduces the amount of bandwidth required to send the image information.

Figure 2:
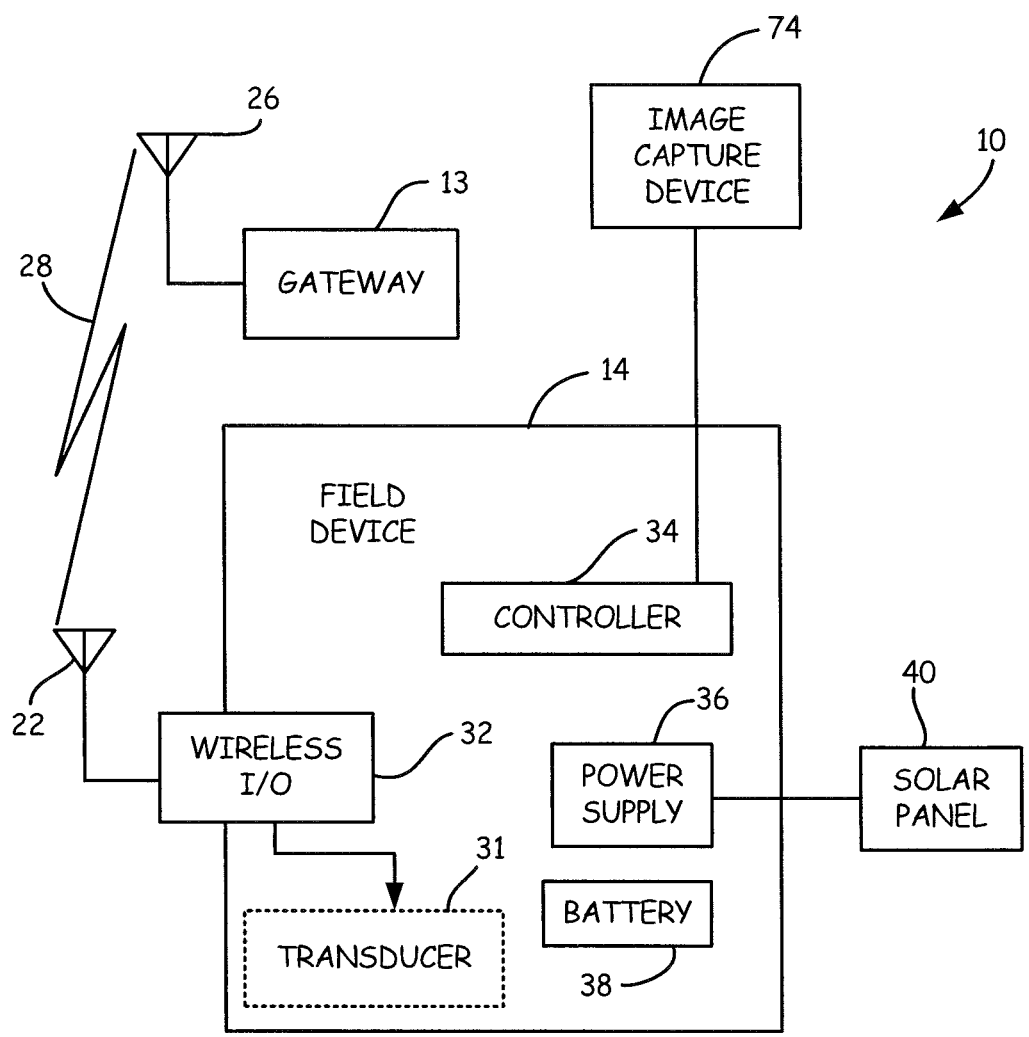
FIG. 2 is a block diagram showing components in a field device of one embodiment of the present invention.

FIG. 2 is a simplified block diagram showing field device 14 shown in FIG. 1 in greater detail. Field device 14 includes an optional transducer 31, wireless input/output (communication) circuitry 32, controller 34, power supply circuit 36, battery 38 and solar panel 40. The transducer 31 can be either a sensor used to sense a process variable or a control element, such as a valve, which is used to control a process variable. The wireless communication circuitry 32 couples to antenna 22 for communication with gateway 13 over its antenna 26. Optionally, device 14 communicates directly with control room 12. Power supply circuit 36 is used to provide power to circuitry within field device 14. The power supply circuitry 36 can operate using internal power received from solar cell 40 or power received from battery 38. The power supply circuitry 36 can be powered from any type of internal power source that does not require wiring to a remote power source. The power supply circuitry 36 can be self-contained within the field device 14 or, in some embodiments, be located externally to the field device and positioned proximate to the field device. For example, a solar powered unit can be used to power a transmitter or other field device over a two wire connection which is also used to carry information. In such a configuration, the power supply circuitry can also provide wireless communication to a remote location. Such configurations are shown and described in U.S. patent application Ser. No. 10/850,828, WIRELESS POWER AND COMMUNICATION UNIT FOR PROCESS FIELD DEVICES filed on May 21, 2004 which is hereby incorporated by reference in its entirety. If sufficient power is received from solar cell 40, power supply circuitry 36 can also be used to charge the battery 38. An image capture device 74 is used to capture images of an environment as explained below in more detail.

Figure 3:
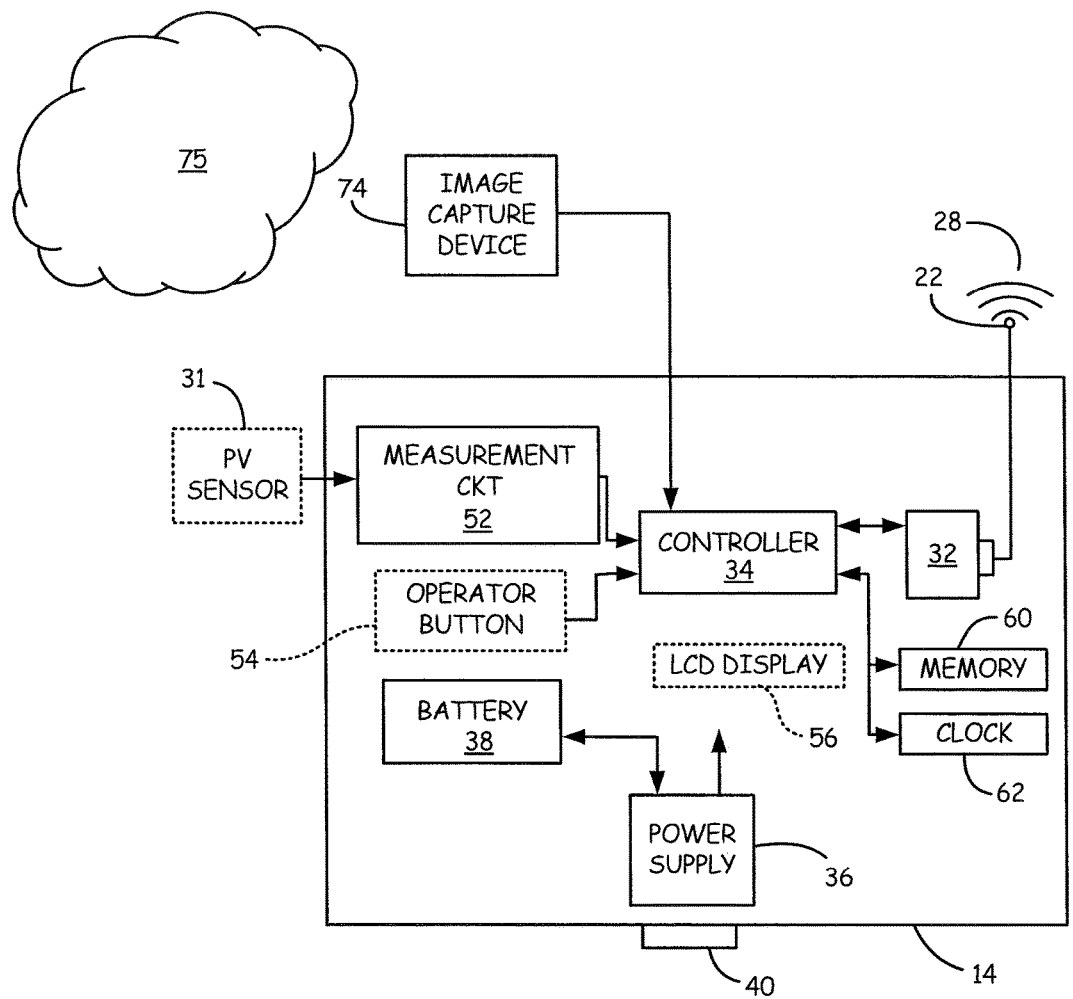
FIG. 3 is a more detailed block diagram showing components of the field device of FIG. 2.

FIG. 3 is a more detailed block diagram of process device 14 according to an embodiment of the present invention and shows optional transducer 31 configured as a process variable sensor. The process variable sensor 31 may be positioned within the housing of device 14 or external to the housing as illustrated in FIG. 3. Measurement circuitry 52 couples to process variable sensor 31 and is used to perform initial signal processing prior to providing a measurement signal to controller 34. An optional user input 54 is shown as operator button in FIG. 3. Similarly, an optional output device such as LCD display 56 is shown.

Controller 34 is typically a microprocessor based controller and couples to a memory 60 and a clock 62. The clock 62 determines the operation speed of digital circuitry within field device 14 and memory 60 is used to store information. Memory 60 can comprise both permanent and volatile memory and can be used to store data used during processing, programming instructions, calibration information, or other information, data or instructions for use with process device 14. Memory 60 also stores image information as described herein.

FIG. 3 also illustrates image capture device 74 in accordance with one example embodiment of the present invention. Image capture device 74 operates as discussed below in more detail and provides an image output consisting of image information to controller 34.

As discussed in the Background section, in some instances it is desirable to visually monitor the environment surrounding a remote field device. Typically, such monitoring requires that a vehicle be dispatched with service personnel who must drive to a remote location to perform a visual inspection. The present invention provides for image monitoring of a remote environment 75 which may include process elements such as a flare, pump-jack, pump, tank, or other component proximate field device 14, 16 at a remote location. This can be used to provide information related to vehicles or personnel in the area, proper operation of equipment such as a pump or well, the presence of a fire or smoke, escaping process fluid, etc.

Wireless field devices which are capable of operating at remote locations that do not require an external power source are available from, for example, Rosemount Inc. of Chanhassen, Minn. Such devices are configured to measure process variables or obtain other process information and transmit information using wireless communication techniques such as the WirelessHART® protocol. However, due to power and bandwidth limitations, such devices are not well suited for transmitting large quantities of data such as is present in image data. Such transmission requires large power consumption and would rapidly deplete the battery of the device thereby shortening the amount of time the device could be left unattended in the field. The present invention provides a method and apparatus for providing image information from such a wireless field device.

In one example configuration, the image capture device 74 comprises a CCD or a CMOS device. The image capture device 74 optionally includes a lens to focus a desired region of the surrounding environment 75 onto the device 74. Optional processing circuitry can be provided which is capable of detecting changes (deltas) in individual pixels or groups of pixels of the device. One example image capture device 74 is an optical mouse sensor such as the ADNS-5090 by Avago Technologies or OV7995 by Omnivision Technologies. This is an example of a device which performs both image capture as well as detecting changes (deltas) in an image and is an implemented single integrated circuit.

FIGS. 4A, 4B and 4C are illustrations of an industrial process environment 75 and illustrate operation of one example embodiment of the present invention. In FIG. 4A, a reference image is shown of an oil rig 80. In FIG. 4B, the same reference image is shown and the sun 82 is also visible. In FIG. 4C, an individual 84 can be seen proximate the oil rig in addition to the sun 82. The reference image illustrated in FIG. 4A can be obtained by image capture device 74 and stored in memory 60. The reference image may be taken at a high resolution for enhanced image processing and analysis at a host site. The reference image can be transmitted at a slow data rate to a remote location such as control room 12 shown in FIG. 1. In another example, the reference image is transferred to the remote location using some means other than RF link 28, 30 and stored at the remote location as the reference image. For example, physical memory such as a memory stick can be used to move the image to the control room 12 shown in FIG. 1. At a subsequent time, a second image is captured by image capture device 74 such as illustrated in FIG. 4B. In 4B, this image differs from the reference image of FIG. 4A in that the sun 82 is visible. For example, subsequent images may be taken minutes or even hours apart. By identifying any changes (deltas) between the two images, controller 34 need only store those portions (pixels) which have changed. In other words, the information from the image related to the sun 82 may be stored in memory 60 and transmitted to a remote location using wireless communication through antenna 22. This conserves both memory and transmission bandwidth.

Yet a second subsequent image is illustrated in FIG. 4C. In this figure, an individual 84 is visible proximate the oil rig. Again, the image is captured by the image capture device 74 and controller 34 stores the changes (deltas) in memory 60 for subsequent wireless transmission. The delta information can be transmitted in near real time, or may be stored in memory 60 for subsequent transmission. For example, the image information may be transmitted when data traffic on the wireless network 28, 30 is relatively low, or when additional power is available for transmission.

The image information which is stored in memory 60 and/or transmitted over wireless communication link 28 is preferably compressed in some manner. The compression can use lossless or lossy techniques. In a lossless technique, no information is lost when the compression occurs. However, a lossy image compression technique results in the compressed image having less information than the original image. Example lossless image compression techniques include run length encoding such as is available PCX, BMP, PNG, TGA and TIFF standards, predictive coding and differential pulse code modulation, entropy encoding, adaptive dictionary encoding algorithms (such as LZW which may be implemented in GIF and TIFF formats), deflation or chain codes. Lossy image compression techniques include techniques which reduce the color space, chroma sub sampling, transform coding (such as implemented in the JPG standard) and fractal compression. However, the present invention is not limited to these compression techniques. The image compression can be implemented within the image capture device 74 itself, within controller 34, or performed by other circuitry in transmitter 14.

In one configuration, controller 34 operates in accordance with instructions stored in memory 60 which allow it to be "trained" to observe a known environment 75 and transmit event messages when certain events have occurred in the environment 75. For example, if a flare or a flame is detected in a particular region of the remote environment 75, a message can be transmitted wirelessly to that effect.

In some configurations, images are captured by image capture device 74 at an increased frame rate during certain events to provide additional images detail of the remote environment 75. Additionally, the captured images may be of a higher resolution. Similarly, the controller 34 can receive instructions wirelessly which increase the rate at which images are captured and/or the resolution of captured images. This command may be generated by another device or may be sent by user.

In another example image compression technique, when a change from the reference image is detected, the controller 34 only transmits information related to the location or region of the reference image in which the change occurred. When this information is received at the control system 12 shown in FIG. 2, the reference image can be displayed to an operator along with information highlighting the region of the environment in which a change was detected. For example, if the highlighted region is at the location of a burner, this information can allow an operator to determine that a flame has been ignited or extinguished. The change in a captured image with respect to the reference image can be detected within the image capture device 74 itself, within controller 34, or by other circuitry within transmitter 14.

Figure 5:
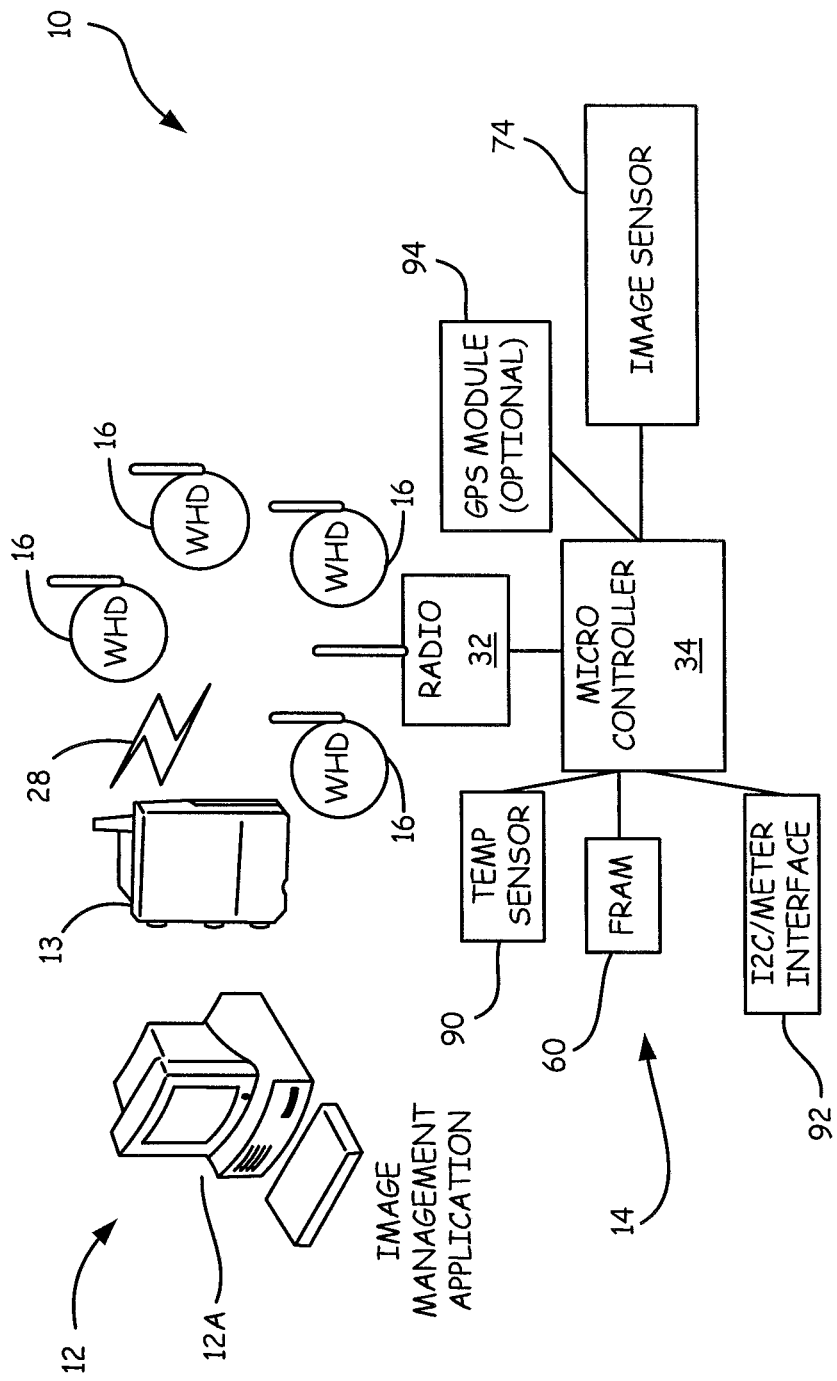
FIG. 5 is another example block diagram similar to FIG. 1 of a process controller monitoring system.

FIG. 5 is another example embodiment of wireless controller monitoring system 10. Control room 12 is illustrated as including a PC 12A configured to run an image management application. A number of different WirelessHART® devices 16 are illustrated which communicate with control room 12 through gateway receiver 13. Communication between gateway 13 and control room 12 may be over a wired or wireless communication link. Field device 14 is shown and includes a number of optional additional inputs. For example, a temperature sensor 90 and a current to capacitance interface 92 are shown. Optional GPS module 94 may be implemented to provide location information to microcontroller 34 which can be used to identify environment 75 image. An optional USB interface 98 is provided for interfacing with microcontroller 34. In FIG. 5, memory 60 is illustrated as FRAM which is one example of a non-volatile memory.

The image information which is transmitted to remote location may optionally include additional information including real time information related to when the image was obtained, location information related to where the image was obtained, positioning information related to a direction that the image capture device is pointed, other sensor information such as temperature, process variables, etc., information which identifies the process device 14 which captured the image, or other information.

The image capture device 74 can be configured for use in harsh environments. For example, a nano coating be used to help ensure that the image aperture remains clean. Another example coating is titanium dioxide which prevents dirt and contaminants from adhering to glass. The image capture device 74 can, itself, record information related to the condition of the aperture. For example, a baseline image may be obtained which is of a clean aperture. This can be used to detect when the aperture becomes dirty by comparing a current image with the baseline image and thereby alert an operator, for example, by transmitting information to control room 12.

The memory 60 of the transmitter 14 can store any number of images or delta information based upon its size and available power. Image information can be removed from the memory 60 once it has been transmitted. In one configuration, a signal is received by process device 14 which indicates that an image has been successfully received at a remote location thereby allowing the stored image to be erased from memory 60. The image information can be transmitted continuously, or can be transmitted in a number of different packets, such as through block transfers. Image change (delta) information typically requires less bandwidth.

In one configuration, an image processing and management application running on PC 12A can be configured to perform object recognition. For example, individuals, vehicles, flames, vapors or gas, smoke, pump position, etc., can be identified. The field device 14 can obtain and/or transmit image information periodically, when a sufficient delta is detected in an image, or upon receipt of a command. Stored images as well as transmitted images may include time information. Further, the device can be configured to store any number of images based upon receipt of a command from a remote location. A host may request that the field device 14 obtain a series of images at a desired resolution and transmit those images. Similarly, if the image capture device 74 includes an actuator to reposition the image capture device 74 to perform a pan and/or tilt function, commands can be sent to the device to control the positioning of the image capture device 74. In a related configuration, the image capture device 74 periodically changes position to observe different areas of the remote environment 75. If a focusing mechanism is provided with the capture device 74, this can further be utilized when capturing an image. In some configurations, the focusing mechanism can be used for near field image capture whereby contaminants on the lens or sensor may be detected.

Figure 6:
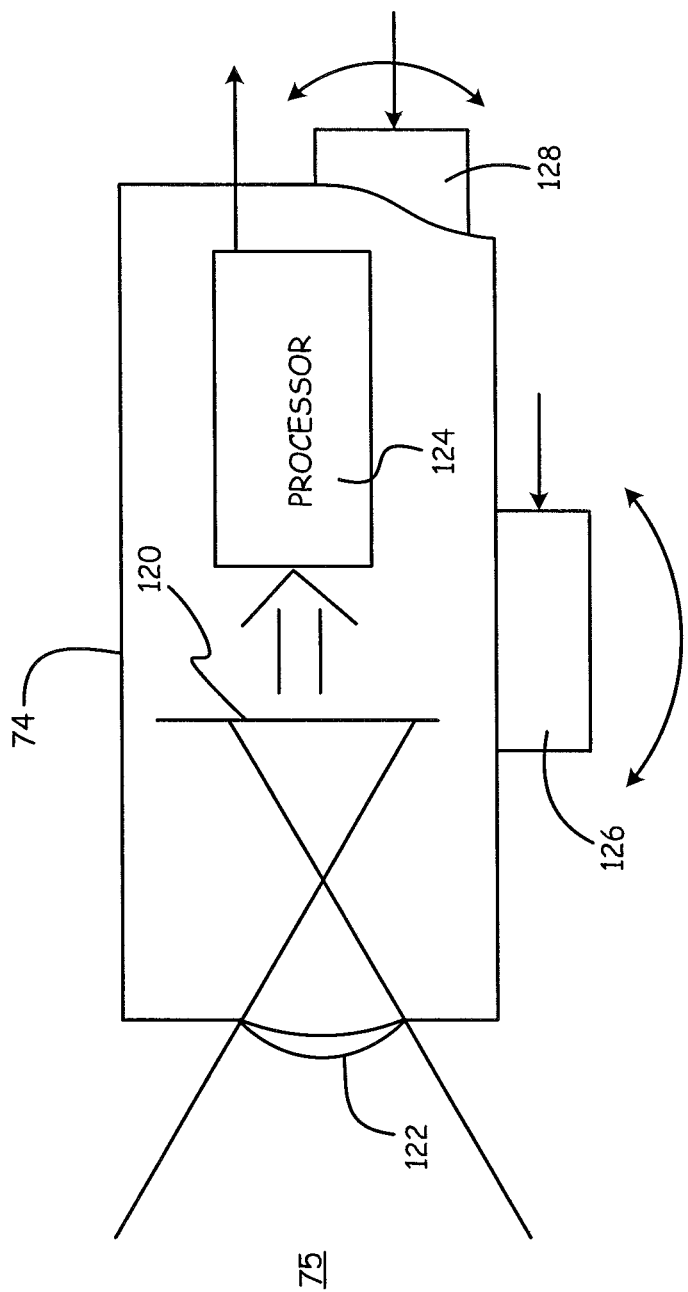
FIG. 6 is a simplified diagram of an image capture device according to an embodiment of the invention.

FIG. 6 is a simplified diagram of one example configuration of image capture device 74. Image capture device 74 includes an image sensor 120 such as a CCD or the like. The image sensor 120 is arranged in a two-dimensional array to capture an image of remote environment 75 which is focused using lens 122. As discussed above, lens 122 may include optional coatings to reduce debris accumulation. An output from sensor 120 is provided to an image processor 124 which is related to the sensed image. Image processor 124 is configured to process the individual pixels from sensor 120 and provide an output to microcontroller 34 discussed above. As also discussed above, in some configurations, processor 124 only provides an output related to changes in the sensed image. In another optional configuration, pan and tilt actuators 126 and 128, respectively, are provided which can be controlled by microcontroller 34 such that image sensor 122 obtains images from different areas of the remote environment 75 as desired. The movement can be in response to a command, occur periodically at a desired time interval, or in response to an event. For example, if a particular sensor in the process is giving an anomalous reading, the image capture device 74 can be pointed to observe that particular area of the process.

In certain embodiments, the invention includes recording only changes in a capture image in order to reduce memory requirements and transmission bandwidth. In another example, captured image data is compressed using image compression techniques. This may include both lossy as well as lossless compression techniques. This also reduces storage and bandwidth requirements. Further, once the image data has been transmitted from the field device 14, any stored image information can be removed from the memory 60. If the storage limit of the memory is reached, older images can be deleted in a first in, first out basis. Large amounts of image data, for example, reference images, can be transferred using multiple blocks or packets sent over the wireless communication link Smaller amounts of image data, for example image delta information, can be transferred using fewer packets. In one configuration, only information related to a region of the image in which a change occurred is transmitted.

A PC 12A can operate an image management application and use to combine a baseline reference image with image delta information. This can be used to reconstruct an image for an operator based upon the baseline reference image and the image delta information. The image management application can further be configured to perform object recognition to recognize various objects or actions in the remote environment 75. Such objects or actions include recognizing people, vehicles, flames, vapor/gas, etc. Similarly, the application can be configured to recognize events such as a flare, people or vehicles entering an area, a flame or explosion, fluid discharge, etc. In another example embodiment, the application can be configured to display a plurality of images on a display to provide an animation viewable by an operator. For example, an operator can configure a selected number of images to be displayed in sequence with a selected starting and ending times. Other image display techniques can be employed, such as, providing exaggeration to those regions of an image containing motion. Object or action recognition can then be performed on the process video for increased detection sensitivity. This allows the image management application to mathematically exaggerate image change (delta) information to make subtle changes more apparent. One example technique has been developed by the Massachusetts Institute of Technology (MIT) and is described in, "MIT News, Researchers amplify variations in video, making the invisible visible, Larry Hardesty, Jun. 22, 2012, http://web.mit.edu/newsoffice/2012/amplifying-invisible0video-0622/html).

The images transferred over the wireless communication link 28 can include additional information such as a time stamp, geographical information, information regarding sensed process variables, information which identifies the portion of the remote environment 75 which is being monitored, information related to a direction at which the image capture device is pointed, etc. The compressed image information is transmitted over the wireless network as packets of information. Note that the wireless network is typically part of a larger network including multiple wireless devices. In many instances, other process related information such as process variables are also transmitted on the same network. It is important that process variables be able to be transmitted. However, if large amounts of image data are being transmitted on the network, the network bandwidth may be limited thereby reducing the amount of bandwidth available for process variable transmission. Thus, the bandwidth required to transmit images is reduced by sending compressed image data. Further, the data packets which contain image information can be tagged with priority information that indicates that they have a lower transmission priority than other packets of information on the wireless network such as packets containing information related to process variables.

In some configurations, the controller 34 has sufficient processing power such that image processing may be performed within the field device 14. For example, the device can monitor the local environment 75 and transmit event messages when certain events have been observed, such as the presence or absence of a flame, etc. In one example configuration, an image of the event is stored in the memory 60. An occurrence of the event can be detected by comparing the stored event image with current image data from the image capture device 74. The field device 14 can transmit event status information periodically, or only upon the occurrence and detection of an event. As desired, the field device may transmit only the event status information but may also include image information including image delta information. Any image information obtained during an event can be stored in the memory 60 including time stamp information. In another example configuration, upon receipt of an event status, the image management application 12A can control the field device 14 to cause it to collect a series of images for subsequent transmission. The image management application 12A can verify the event prior to an operator being notified.

Although the present invention has been described with reference to preferred embodiments, workers skilled in the art will recognize that changes may be made in form and detail without departing from the spirit and scope of the invention. As used herein, the term "compressed image information" refers to image information which has been compressed in a manner to consist of less data than original image information. The compression can be lossless or lossy and includes techniques which simply provide information related to a location in an image in which the image has changed including how much the image has changed in that particular location. It does not include information which simply indicates that something in an image has changed without any information regarding a location. Further, the term "image change information" includes information which indicates that there has been a change in at least some portion of the image, and includes such information which does not have to specifically indicate where in an image a change has occurred. Transmission of compressed image information or image change information can be triggered by comparing an amount of change to a threshold. If a threshold is exceeded, transmission can be enabled. The image capture device can be sensitive to any desired wavelength including optical, infrared and ultraviolet. In one aspect, the field device operates using power stored in an internal battery or the like.

What is claimed is:

1. A wireless field device for use in an industrial process control or monitoring system, comprising:
    a controller configured to control operation of the field device;
    wireless communication circuitry configured to wirelessly communicate with a remote location using a communication protocol which has bandwidth limitations;
    an internal power source configured to wholly power the field device; and
    an image capture device coupled to the controller configured to capture an image of an environment of the field device, the image comprising process elements proximate the field device;
    a memory configured to store image information from images captured by the image capture device, the image information comprising a reference image;
    wherein the controller is adapted to retrieve the stored reference image from the memory, transmit the reference image to the remote location, detect changes between the image and the reference image, and transmit the compressed image information comprising a difference between the image captured by the image capture device and the stored image information, thereby reducing communication bandwidth used to transmit image information to the remote location and reduce power consumed by the wireless field device from the internal power source.

2. The wireless field device of claim 1, wherein the stored image information comprises baseline image information.

3. The wireless field device of claim 1, wherein the stored image information comprises compressed image information.

4. The wireless field device of claim 1, wherein the stored image information comprises image change information.

5. The wireless field device of claim 3, wherein the compressed image information includes higher resolution image information in response to a command received through the wireless communication circuitry.

6. The wireless field device of claim 3, wherein the compressed image information includes higher resolution image information in response to detection of a change in the image.

7. The wireless field device of claim 3, wherein the compressed image information includes higher frame rate image information in response to a command received through the wireless communication circuitry.

8. The wireless field device of claim 3, wherein the compressed image information includes higher frame rate image information in response to detection of a change in the image.

9. The wireless field device of claim 3, wherein the compressed image information comprises lossy compressed image information.

10. The wireless field device of claim 3, wherein the compressed image information comprises lossless compressed image information.

11. The wireless field device of claim 3, wherein the compressed image information comprises location information related to a region in the image at which the image has changed.

12. A wireless monitoring system including the wireless field device of claim 1 and an image management application at the remote location configured to receive the compressed image information.

13. The wireless monitoring system of claim 12, wherein the image management application includes a baseline image.

14. The wireless monitoring system of claim 12, wherein the image management application is configured to identify objects in the image.

15. The wireless field device of claim 1, including an actuator configured to reposition the image capture device.

16. The wireless field device of claim 1, further including a process variable sensor and wherein information related to a sensed process variable is communicated by the wireless communication circuitry.

17. The wireless field device of claim 1, including an image management application configured to display a plurality of captured images in an animation.

18. The wireless field device of claim 1, including an image management application configured to exaggerate image change information to thereby amplify changes in the captured images.

19. The system of claim 1, wherein the compressed image information is transmitted with a reduced priority level.

20. A method in a wireless field device in an industrial process control or monitoring system, comprising:
receiving an image from an image capture device, the image of an environment of the field device, the image comprising process elements proximate the field device;
storing image information from the captured image into a memory, the image information comprising a reference image;
processing the stored image information with a controller in the wireless field device, detecting a difference between an image captured by the image capture device and the reference image;
wholly powering the field device with an internal power source which is internal to the field device;
wirelessly communicating the reference image to the remote location, and the detected differences between the captured image and the reference image to the remote location using wireless communication circuitry in the wireless field device, thereby reducing communication bandwidth used to transmit image information to the remote location and reduce power consumed by the wireless field device from the internal power source.

21. The method of claim 1 including storing compressed image information in a memory.

22. The wireless field device of claim 1 wherein the communication protocol comprises wireless HART®.

23. The method of claim 20 wherein the wireless communication of the reference image to the remote location is in accordance with wireless HART®.

\* \* \* \* \*